US012524949B2

United States Patent
Ökvist et al.

(10) Patent No.: US 12,524,949 B2
(45) Date of Patent: Jan. 13, 2026

(54) PRIORITIZING RENDERING BY EXTENDED REALITY RENDERING DEVICE RESPONSIVE TO RENDERING PRIORITIZATION RULES

(71) Applicant: Telefonaktiebolaget LM Ericsson (publ), Stockholm (SE)

(72) Inventors: Peter Ökvist, Luleå (SE); Tommy Arngren, Södra Sunderbyn (SE); Andreas Kristensson, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 152 days.

(21) Appl. No.: 18/562,016

(22) PCT Filed: May 19, 2021

(86) PCT No.: PCT/EP2021/063340
§ 371 (c)(1),
(2) Date: Nov. 17, 2023

(87) PCT Pub. No.: WO2022/242854
PCT Pub. Date: Nov. 24, 2022

(65) Prior Publication Data
US 2024/0257434 A1     Aug. 1, 2024

(51) Int. Cl.
*G06T 15/00*     (2011.01)
*G06F 3/01*     (2006.01)
(Continued)

(52) U.S. Cl.
CPC ............ *G06T 15/005* (2013.01); *G06F 3/011* (2013.01); *G06Q 50/01* (2013.01); *G06T 13/40* (2013.01);
(Continued)

(58) Field of Classification Search
None
See application file for complete search history.

(56) References Cited

U.S. PATENT DOCUMENTS

| | | |
|---|---|---|
| 8,276,080 B2 | 9/2012 | Tatsubori |
| 10,127,290 B1 | 11/2018 | Armstrong et al. |

(Continued)

FOREIGN PATENT DOCUMENTS

| | | |
|---|---|---|
| EP | 0942397 A2 | 9/1999 |
| EP | 0978026 A2 | 2/2000 |

(Continued)

OTHER PUBLICATIONS

International Search Report and Written Opinion of the International Searching Authority, PCT/EP2021/063340, mailed May 11, 2022, 24 pages.

(Continued)

*Primary Examiner* — Martin Mushambo
(74) *Attorney, Agent, or Firm* — Sage Patent Group (57) ABSTRACT

An XR rendering device renders an immersive XR environment on a display device for viewing by a participant among a group of participants who have associated avatars representing the participants which are rendered in the immersive XR environment. The XR rendering device obtains rendering prioritization rules which indicate conditions for prioritizing rendering of avatars and/or virtual objects associated with the avatars. The XR rendering device prioritizes rendering of particular ones of the avatars and/or particular ones of the virtual objects which have satisfied conditions indicated by the rendering prioritization rules, when rendering in the immersive XR environment the avatars representing the group of the participants and/or the virtual objects associated with the avatars.

18 Claims, 4 Drawing Sheets

(51) Int. Cl.
  *G06Q 50/00* (2012.01)
  *G06T 13/40* (2011.01)
  *G06T 19/00* (2011.01)
  *H04N 7/15* (2006.01)

(52) U.S. Cl.
  CPC ........... *G06T 19/006* (2013.01); *H04N 7/157* (2013.01); *G06F 2203/011* (2013.01)

(56) References Cited

U.S. PATENT DOCUMENTS

| | | | |
|---|---|---|---|
| 10,909,757 | B2 | 2/2021 | Childress et al. |
| 10,909,767 | B1 | 2/2021 | Childress et al. |
| 11,010,129 | B1 | 5/2021 | Rakshit |
| 11,012,482 | B1 | 5/2021 | Yerli |
| 11,068,046 | B1* | 7/2021 | Zavesky ............... G06Q 50/01 |
| 2005/0080900 | A1 | 4/2005 | Culbertson et al. |
| 2009/0100035 | A1* | 4/2009 | Cradick ............... G06F 16/907 707/999.005 |
| 2009/0109229 | A1 | 4/2009 | Hamilton, II et al. |
| 2010/0070884 | A1* | 3/2010 | Bromenshenkel .... G06F 3/0481 715/757 |
| 2010/0121810 | A1* | 5/2010 | Bromenshenkel .. G06F 3/04815 706/54 |
| 2010/0122182 | A1* | 5/2010 | Bromenshenkel ...... G06F 3/011 715/745 |
| 2011/0029897 | A1* | 2/2011 | Russell ................. G05B 15/02 715/757 |
| 2011/0055734 | A1 | 3/2011 | Borst et al. |
| 2012/0188233 | A1* | 7/2012 | Shuster ................. G06T 15/20 345/419 |
| 2013/0201104 | A1 | 8/2013 | Ptucha et al. |
| 2013/0257752 | A1 | 10/2013 | Tripathi et al. |
| 2014/0022332 | A1 | 1/2014 | Wang et al. |
| 2014/0210857 | A1* | 7/2014 | Liu ....................... G06T 19/006 345/633 |
| 2014/0253667 | A1* | 9/2014 | Tian ..................... H04N 23/698 348/14.07 |
| 2014/0361977 | A1 | 12/2014 | Stafford et al. |
| 2016/0026253 | A1 | 1/2016 | Bradski et al. |
| 2016/0180591 | A1 | 6/2016 | Shiu et al. |
| 2016/0217623 | A1 | 7/2016 | Singh |
| 2016/0359941 | A1* | 12/2016 | Kvaal ................... H04L 65/403 |
| 2017/0039750 | A1 | 2/2017 | Tong et al. |
| 2017/0099462 | A1* | 4/2017 | Tangeland ............. H04N 7/147 |
| 2017/0231532 | A1* | 8/2017 | Chakravarty ........ A61B 5/1122 600/595 |
| 2018/0063206 | A1 | 3/2018 | Faulkner |
| 2018/0247453 | A1* | 8/2018 | Nakashima .............. G09G 5/00 |
| 2018/0295158 | A1 | 10/2018 | Faulkner |
| 2019/0025913 | A1 | 1/2019 | Cheng et al. |
| 2019/0026589 | A1 | 1/2019 | Sugihara et al. |
| 2020/0066049 | A1* | 2/2020 | Sun ........................ G06Q 10/10 |
| 2020/0289941 | A1 | 9/2020 | Khan et al. |
| 2020/0349768 | A1* | 11/2020 | Zavesky ............... G06T 19/006 |
| 2021/0336784 | A1* | 10/2021 | Athlur ................ H04L 63/0442 |
| 2022/0400244 | A1* | 12/2022 | Schaefer ................ H04N 7/147 |

FOREIGN PATENT DOCUMENTS

| | | |
|---|---|---|
| EP | 2015200 A1 | 1/2009 |
| JP | 5294612 B2 | 9/2013 |
| WO | 2022008075 A1 | 1/2022 |
| WO | 2022242855 A1 | 11/2022 |

OTHER PUBLICATIONS

Que, Ying Peng et al., "Rendering Models for Immersive Voice Communications within Distributed Virtual Environment," TENCON 2005: 2005 IEEE Region 10 Conference, Nov. 21-24, 2005, Melbourne, Australia, 6 pages.

Rubin, Peter (Wired), "Facebook Can Make VR Avatars Look—and Move—Exactly Like You," Mar. 13, 2019; Downloaded from the Internet at: https://www.wired.com/story/facebook-oculus-codec-avatars-vr/, 9 pages.

International Search Report and Written Opinion of the International Searching Authority, PCT/EP2021/063342, mailed Feb. 11, 2022, 13 pages.

\* cited by examiner

PRIORITIZING RENDERING BY EXTENDED REALITY RENDERING DEVICE RESPONSIVE TO RENDERING PRIORITIZATION RULES

CROSS REFERENCE TO RELATED APPLICATIONS

This application is a 35 U.S.C. § 371 national stage application of PCT International Application No. PCT/EP2021/063340 filed on May 19, 2021, the disclosure and content of which is incorporated by reference herein in its entirety.

TECHNICAL FIELD

The present disclosure relates to rendering extended reality (XR) environments and associated XR rendering devices, and more particularly to rendering avatars and virtual objects in immersive XR environments displayed on XR participant devices.

BACKGROUND

Immersive extended reality (XR) environments have been developed which provide a myriad of different types of user experiences for gaming, on-line meetings, co-creation of products, etc. Immersive XR environments (also referred to as "XR environments") include virtual reality (VR) environments where human users only see computer generated graphical renderings and include augmented reality (AR) environments where users see a combination of computer generated graphical renderings overlaid on a view of the physical real-world through, e.g., see-through display screens.

Immersive XR environments, such as gaming environments and meeting environments, are often configured to display computer generated avatars which represent poses of human users in the immersive XR environments. A user may select and customize an avatar, such as gender, clothing, hair style, etc. to represent that user for viewing by other users participating in the immersive XR environment. Example XR environment rendering devices include, without limitation, XR environment servers, XR headsets, gaming consoles, smartphones running an XR application, and tablet/laptop/desktop computers running an XR application. Oculus Quest is an example XR device and Google Glass is an example AR device.

Rendering an XR environment in real-time or near-real-time is computationally intensive and requires trade-offs between device responsiveness and the level of rendered graphical detail in order to not exceed the computational capacity (e.g., graphics processing unit (GPU) bandwidth) of the XR rendering device. Various technical approaches are directed to reducing or constraining the rendering computational requirements.

There are various approaches intended to reduce rendering load in context of e.g. XR gaming, etc. One approach is known as foveated rendering where an XR headset, XR glasses, etc. worn by an XR environment participant uses eye tracking to determine where the eyes are directed relative to an area of the XR environment displayed on a head-mounted display, and responsively controls rendering to provide higher resolution quality (e.g., image and/or video quality) for a sub-area of the area corresponding to the user's primary eye focus while reducing the resolution quality outside the user's primary eye focus, such as within the user's peripherical vision.

Another approach is referred to as fixed foveated rendering which controls rendered resolution quality based on a fixed focal orientation relative to the user's location within the XR environment.

Another approach assumes a fixed rendering depth, where virtual objects that are within a fixed distance of the user's location in the XR environment are rendered with higher resolution quality relative to other virtual objects that are location beyond the fixed distance. For example, spherical rendering (i.e. 360-sphere) operates to provide high resolution rendering within the sphere. The larger the distance (e.g., radius) of "the high-resolution sphere" that is defined around the user, the greater the computational rendering load that is required from the XR rendering device. Although spherical rendering can provide a high user quality of experience for panning, image-tracking and/or mobility, etc., the computational requirements can exceed the capacity of a commercially available or viable XR rendering device.

SUMMARY

Some embodiments disclosed herein are directed to an XR rendering device including at least one processor and at least one memory storing instructions executable by the at least one processor to perform operations. The operations render an immersive XR environment on a display device for viewing by a participant among a group of participants who have associated avatars representing the participants which are rendered in the immersive XR environment. The operations obtain rendering prioritization rules which indicate conditions for prioritizing rendering of avatars and/or virtual objects associated with the avatars. The operations prioritize rendering of particular ones of the avatars and/or particular ones of the virtual objects which have satisfied conditions indicated by the rendering prioritization rules, when rendering in the immersive XR environment the avatars representing the group of the participants and/or the virtual objects associated with the avatars.

Some other related embodiments are directed to a corresponding method by an XR rendering device. The method renders an immersive XR environment on a display device for viewing by a participant among a group of participants who have associated avatars representing the participants which are rendered in the immersive XR environment. The method obtains rendering prioritization rules which indicate conditions for prioritizing rendering of avatars and/or virtual objects associated with the avatars. The method prioritizes rendering of particular ones of the avatars and/or particular ones of the virtual objects which have satisfied conditions indicated by the rendering prioritization rules, when rendering in the immersive XR environment the avatars representing the group of the participants and/or the virtual objects associated with the avatars.

Some other related embodiments are directed to a corresponding computer program product including a non-transitory computer readable medium storing program code executable by at least one processor of an XR rendering device for performing operations. The operations render an immersive XR environment on a display device for viewing by a participant among a group of participants who have associated avatars representing the participants which are rendered in the immersive XR environment. The operations obtain rendering prioritization rules which indicate conditions for prioritizing rendering of avatars and/or virtual objects associated with the avatars. The operations also prioritize rendering of particular ones of the avatars and/or particular ones of the virtual objects which have satisfied conditions indicated by the rendering prioritization rules, when rendering in the immersive XR environment the avatars representing the group of the participants and/or the virtual objects associated with the avatars.

Some potential advantages of various embodiments disclosed herein is that they provide means to enhance the experience of meetings or sessions in immersive XR environments by prioritizing which avatars and/or faces among a set of potential avatars representing individual ones of a group of participants that should be prioritized for a XR rendering of a media stream to a participant viewing the immersive XR environment.

Other XR rendering device, methods, and computer program products according to embodiments will be or become apparent to one with skill in the art upon review of the following drawings and detailed description. It is intended that all such additional XR rendering device, methods, and computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Various embodiments of the present disclosure are directed to devices and methods for dynamic avatar representation in immersive extended reality (XR) environments and which use rendering prioritization rules to determine which avatars and/or the virtual objects associated with avatars that should be prioritized for higher quality rendering. Higher quality rendering can include, but is not limited to, any or more of fine-grained resolution and details, higher video frame rate, higher audio bitrate, depth of field, or selective rendering of quality of parts of avatars and/or objects associated with the avatars. Rendering prioritization may be performed based on relations between individual participants in a group of participants in the immersive XR environment.

For example, a first participant may have a defined role relative to other participants which causes prioritization of higher quality XR rendering of the avatar associated with the first participant and/or a virtual object associated with the avatar by an XR rendering device. Certain participant-attributes such as a defined role in a meeting, social relations with other participants, digital meeting context (i.e., casual, professional), physical environment & sensor attributes, geo-location, social media attributes (e.g., Tinder preferences), etc., may be used as input to control XR rendering prioritizations.

Figure 1:
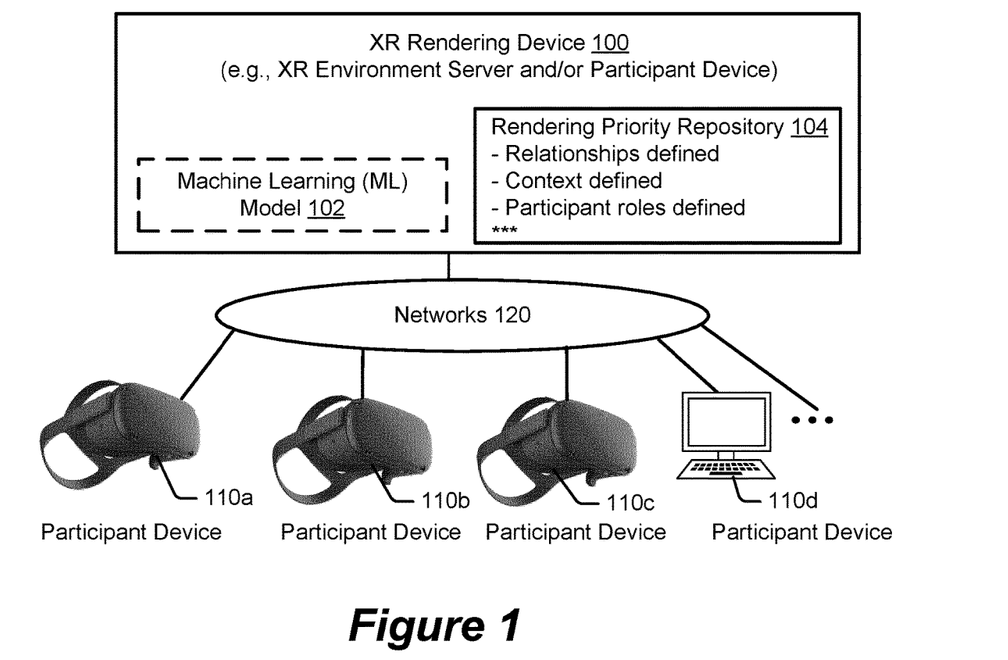
FIG. 1 illustrates an XR system that includes a plurality of participant devices that communicate through networks with an XR rendering device to operate in accordance with some embodiments of the present disclosure.

FIG. 1 illustrates an XR system that includes a plurality of participant devices 110a-d that communicate through networks 120 with an XR rendering device 100 to operate in accordance with some embodiments of the present disclosure. The XR rendering device 100 is configured to generate a graphical representation of an immersive XR environment (also called an "XR environment" for brevity) which is viewable from various perspectives of virtual poses of human participants in the XR environment through display screens of the various participant devices 110a-d. For example, the illustrated devices include VR headsets 110a-c which can be worn by participants to view and navigate through the XR environment, and a personal computer 110d which can be operated by a participant to view and navigate through the XR environment. The participants have associated avatars which are rendered in the XR environment to represent poses (e.g., location, body assembly orientation, etc.) of the participants relative to a coordinate system of the XR environment.

Although the XR rendering device 100 is illustrated in FIG. 1 and elsewhere as being separate from one or more of the participant devices, in some other embodiments the XR rendering device 100 is implemented as a component of one or more of the participant devices. For example, one of the participant devices may be configured to perform operations of the XR rendering device in a centralized manner controlling rendering for or by other ones of the participant devices. Alternatively, each of the participant devices may be configured to perform at least some of the operations of the XR rendering device in a distributed decentralized manner with coordinated communications being performed between the distributed XR rendering devices (e.g., between software instances of XR rendering devices).

Figure 2:
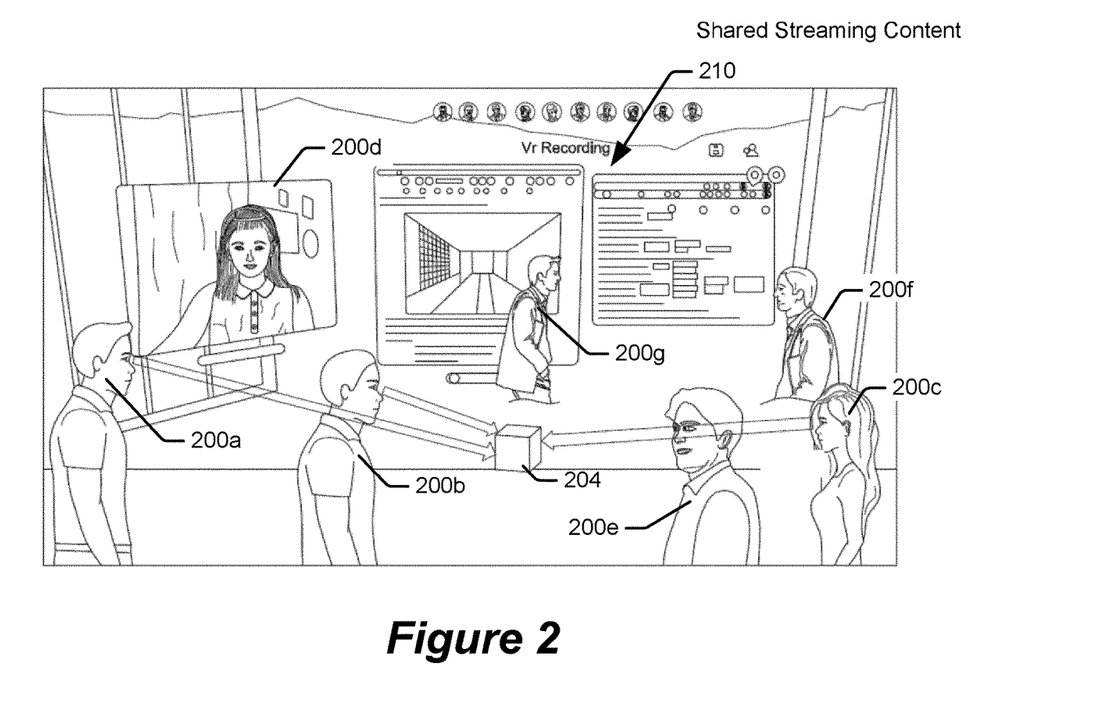
FIG. 2 illustrates an immersive XR environment with participants' avatars and a shared virtual presentation screen that are rendered with various poses within the XR environment, in accordance with some embodiments of the present disclosure.

FIG. 2 illustrates an immersive XR environment with avatars 200a-f that are graphically rendered with poses (e.g., at locations and with orientations) representing the present field of views (FOVs) of associated human participants in the XR environment. In the illustrated example, streaming video from a camera of the participant device 110d (personal computer) is displayed in a virtual screen 200d instead of rendering an avatar to represent the participant. A shared virtual presentation screen 210 is also graphically rendered at a location within the XR environment, and can display pictures and/or video that are being presented for viewing by the participants in the XR environment. A virtual object 204 is graphically rendered in the XR environment. The virtual object 204 may be graphically rendered in the XR environment with any shape or size, and can represent any type of object (e.g., table, chair, object on table, door, window, television or computer, virtual appliance, animated vehicle, animated animal, etc.). The virtual object 204 may represent a human participant in the XR environment (e.g., an avatar representation of a human participant) and may be animated to track movement and pose of the human participant within the XR environment responsive to movement input from the human participant and/or responsive to output of an eye-tracking device and/or head-tracking device.

In a multi-participant XR environment scenario such as illustrated in FIG. 2, a XR rendering device (e.g., an XR environment server or a participant device 110*a*) can become constrained by its processing bandwidth limitations when attempting to simultaneously render in real-time each of the participants' avatars, the virtual screen 200*d*, the shared virtual presentation screen 210, and the virtual objects including room surfaces, virtual objects associated with the avatars, and other parts of the immersive XR environment.

Some potential advantages of various embodiments disclosed herein is that they provide means to enhance the experience of meetings or sessions in immersive XR environments by prioritizing which avatars representing participants and/or virtual objects associated with the avatars should be prioritized for XR rendering in a media stream provided to a participant viewing the immersive XR environment. Avatars and/or virtual objects which satisfy rendering prioritization rules would be assigned higher rendering priority, and associated rendered-bits are then provided for viewing before other less important bits and/or are rendered with higher graphical detail quality.

Figure 4:
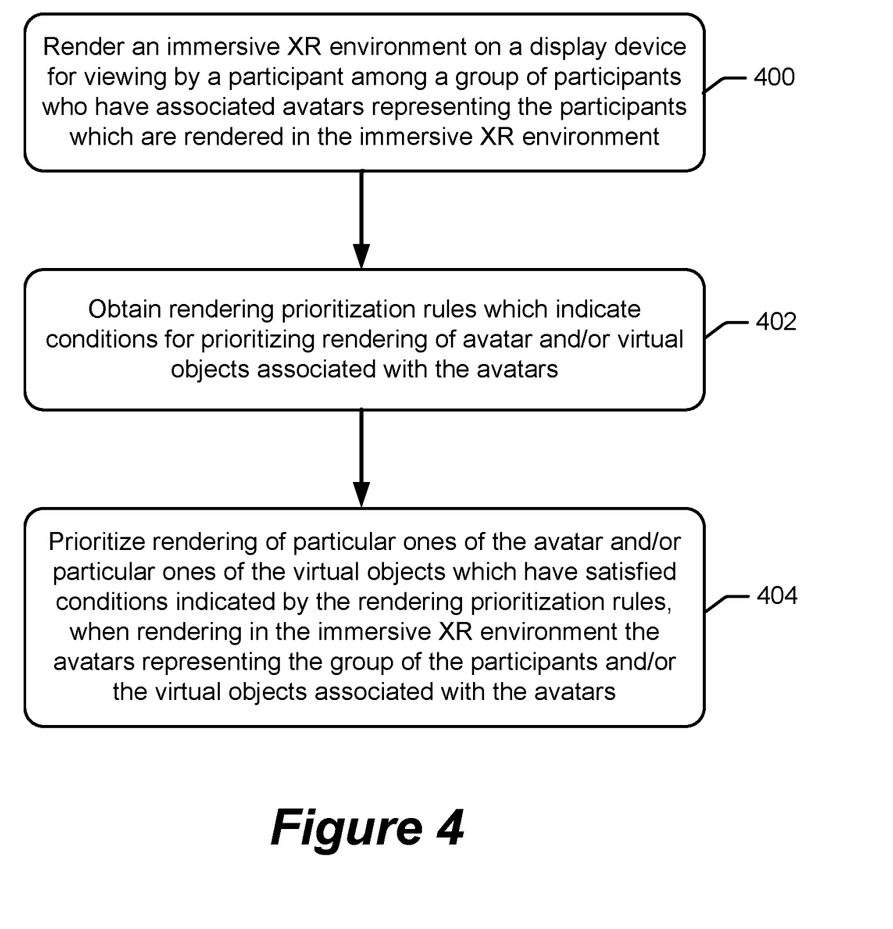
FIG. 4 is a flowchart of operations that can be performed by an XR rendering device in accordance with some embodiments of the present disclosure.

FIG. 4 is a flowchart of operations that can be performed by the XR rendering device 100 in accordance with some embodiments of the present disclosure.

Referring to FIGS. 1, 2, and 4, in some embodiments, an XR rendering device 100 is configured for rendering 400 an immersive XR environment on a display device (e.g., of one or more of participant devices 110*a*-110*x* in FIG. 1) for viewing by a participant among a group of participants who have associated avatars representing the participants which are rendered in the immersive XR environment. The XR rendering device 100 is configured to obtain 402 rendering prioritization rules which indicate conditions for prioritizing rendering of avatars (e.g., any of avatars 200*a*-*g*) and/or virtual objects associated with the avatars (e.g., virtual object 204). The XR rendering device 100 is also configured to prioritize rendering of particular ones of the avatars and/or particular ones of the virtual objects which have satisfied conditions indicated by the rendering prioritization rules, when rendering in the immersive XR environment the avatars representing the group of the participants and/or the virtual objects associated with the avatars.

For example, a rendering prioritization rule can indicate one avatar (e.g., avatar 200*a*) representing a first participant and/or a virtual object associated with the avatar (e.g., virtual object 204 in FOV of avatar 200*a*) is preferred to be prioritized for rendering. The XR rendering device 100 can, when rendering in the immersive XR environment a plurality of avatars (e.g., avatars 200*a*-*g*) representing the participants among a group of participants and/or a plurality of virtual objects which includes the virtual object associated with the avatars (e.g., virtual object 204 in FOV of avatars 200*a*-*c*), operate to prioritize 404 rendering of particular ones of the avatars (e.g., avatar 200*a*) and/or particular ones of the virtual objects (e.g., virtual object 204 in FOV of avatar 200*a*) which have satisfied conditions indicated by the rendering prioritization rule.

As was explained above, the participant devices may be any type of XR device. In some embodiments some or all of the participant devices are virtual reality (VR) headsets in which the wearers only see computer generated graphical renderings such as avatars, virtual objects, etc. In some other embodiments, some or all of the participant devices are augmented reality (AR) headsets (e.g., glasses) through which wearers see a combination of computer generated graphical renderings overlaid on a view of the physical real-world through, e.g., see-through display screens. In the case of an AR headset, the XR rendering device 100 can render graphical objects, textures, and color shading that is overlaid on the wearer's view of the physical real-world, such as a computer generated graphical rendering of clothing which is posed on a display screen to be viewed as overlaid on the real-world body of another participant and/or as a computer generated graphical rendering of a virtual object (e.g., weapon, handbag, hat, shield, scooter, etc.) which is posed on a display screen to be viewed as being carried by, connected to, or otherwise associated with the real-world body of the other participant.

Accordingly, in situations when the XR rendering device 100 becomes processing bandwidth limited with resulting degraded ability to provide rendering quality, the XR rendering device 100 operates to render the graphical details of the avatar 200*a* with a higher priority than other avatars 200*b*-*g* which can result in higher resolution quality being rendered for the avatar graphical details when viewed by a participant in the XR environment and can correspondingly result in lower resolution quality being rendered for the other avatars 200*b*-*g* and/or for virtual objects associated with the other avatars 200*b*-*g*, when viewed by the participant.

In the example context of FIG. 1, the rendering prioritization rule is stored in a rendering priority data structure repository 104 with an association to an identity of the participant viewing the immersive XR environment. The XR rendering device can then query the rendering priority data structure repository 104 using the identity of the participant viewing the immersive XR environment to obtain the rendering prioritization rule of the participant, such as will be described in further detail below regarding FIG. 3.

Similarly, other participants may define one or more rendering prioritization rule that are stored in the rendering priority data structure repository 104 with associations to corresponding identities of the other participants who request such rendering prioritization.

In some embodiments, the conditions indicated by the rendering prioritization rules are related to at least one of:
1) personal relationships defined among the participants in the immersive XR environment;
2) contexts of the immersive XR environment; and
3) participant roles in the immersive XR environment.

In some embodiments, the 1) personal relationships defined among the participants in the immersive XR environment are related to at least one of:
a) observed historical interaction between first and second participants among the group of participants in the immersive XR environment;
b) the first participant having contact information stored in a contact information repository for the second participant;
c) the first participant having been in a previous session for an immersive XR environment with the second participant; and d) the first participant having interacted with an avatar representing the second participant during a previous session for an immersive XR environment.

In some embodiments, the above 2) contexts of the immersive XR environment are related to at least one of:
   a) type of immersive XR environment (e.g., XR gaming environment, XR social environment, XR meeting environment);
   b) number of participants in the immersive XR environment;
   c) number of participants who are actively interacting with the immersive XR environment;
   d) identities of participants who are actively interacting with the immersive XR environment; and
   e) identities of participants who are interacting with other participants within the immersive XR environment.

In some embodiments, the above 3) participant roles in the immersive XR environment relate to at least one of:
   a) one of the participants having a presenter status;
   b) one of the participants having a meeting organizer status; and
   c) one of the participants having a non-presenting participant status.

Some embodiments are directed to determining an active participant status and applying it to the rendering prioritization rules. In some embodiments, the conditions indicated by the rendering prioritization rules are related to at least one of:
   a) an avatar of a first participant among the group of participants is animated as actively talking;
   b) voice loudness of the first participant;
   c) the first participant streaming content to other participants among the group of participants;
   d) the first participant having an avatar within a threshold angular offset of current field of view, FOV, of the participant viewing the immersive XR environment;
   e) the FOV of the participant viewing the immersive XR environment rotating towards the avatar of the first participant;
   f) the participant viewing the immersive XR environment having eye-contact with the avatar of the first participant; and
   g) the participant viewing the immersive XR environment inputting a gesture towards the avatar of the first participant.

A second participant may satisfy a rendering prioritization rule as having an active participant status when it is determined that the second participant addresses a first participant specifically. For example, the rendering prioritization rule may be satisfied by the second participant having addressed the first participant by name or by sending/receiving an in-application text message. In another example, the rendering prioritization rule may be satisfied by the first and second participants being located in a same friend/family-zone of the XR environment.

Some embodiments are directed to determining one participant has an avatar that is about to emerge within the FOV of the participant viewing the immersive XR environment. In some embodiments, the conditions indicated by the rendering prioritization rules are related to at least one of:
   a) the avatar of a first participant among the group of participants is within a threshold distance of location of the avatar of the participant viewing the immersive XR environment;
   b) the avatar of the first participant is within a threshold distance of emerging from behind a virtual object of the immersive XR environment that is currently preventing viewing by the participant viewing the immersive XR environment; and
   c) the avatar of the first participant is within a threshold time of become viewable by the participant viewing the immersive XR environment based on projected movement by the avatar of the one of the participants or by the participant viewing the immersive XR environment.

Prediction of emerging active participants may be determined by a participant's relative mobility patterns. For example, determining the participant is "approaching," the participant has an "ETA estimated in x seconds," or the participant has is "just around corner/other side of object." An avatar may be prioritized for rendering based on the avatar being predicted to become "active" within view of another participant within a pre-determined (adaptive, etc.) number of seconds. In one example, "any approaching participant" may not satisfy the rendering prioritization rules, however the rules may be satisfied when the approaching participant's avatar has an identified social relation to a participant viewing the XR environment.

In some embodiments, one of the conditions indicated by the rendering prioritization rules is related to a facial emotion status of the avatar of one of the participants.

Rendering priority may be determined based on a certain offset to an expected or determined baseline of facial emotions: such as a small facial emotion offset can be defined as "usual", larger facial emotion offset can be defined as "someone being angry, sad or happy associated with action from first user". The rendering prioritization rules may be based on the determined categorization of the facial emotion. Avatar rendering for a larger-offset facial emotion can prioritized. i.e., such as when something suddenly happens in the ongoing meeting and at least one person gets upset, happy, or angry: then rendering priority is provided to that person. If a plethora of people were determined with changed "offset", priority to positive/negative emotion changes may be given priority.

In some embodiments, one of the conditions indicated by the rendering prioritization rules is related to rendering resource loading of a participant's device relative to a threshold capacity level.

In some embodiments, when rendering in the immersive XR environment the avatars representing the group of the participants and/or the virtual objects associated with the avatars, the operations prioritize rendering one of the virtual objects based on the rendering prioritization rules defining one of the following conditions that is determined to be satisfied:
   a) the virtual object is touched by the avatar of a first participant among the group of participants;
   b) the virtual object is within a threshold distance of the avatar of the first participant, wherein the threshold distance is defined by the rendering prioritization rules;
   c) the virtual object is within a field of view, FOV, of a pose of the avatar in the immersive XR environment;
   d) the virtual object is within a threshold angular offset from the FOV of the pose of the avatar of the first participant, wherein the threshold angular offset is defined by the rendering prioritization rules;
   e) the virtual object is predicted to become within the FOV of the pose of the avatar of the first participant within a threshold time defined by the rendering prioritization rules; and f) the virtual object is predicted to become within the threshold distance of the avatar of the first participant within the threshold time defined by the rendering prioritization rules.

Figure 3:
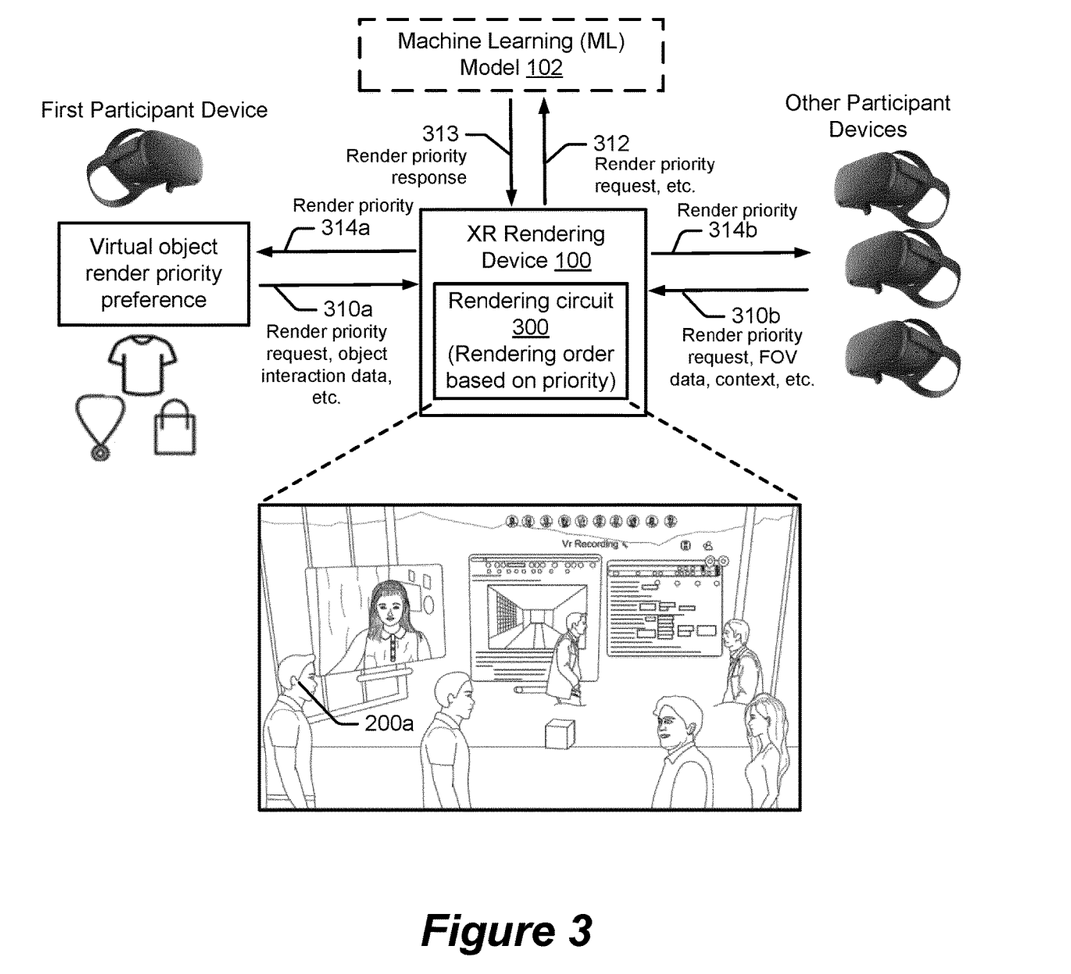
FIG. 3 is a further block diagram of an XR system which illustrates message flows and operations between a plurality of participant devices and an XR rendering device in accordance with some embodiments of the present disclosure.

FIG. 3 is a further block diagram of an XR system which illustrates message flows and operations between a plurality of participant devices and the XR rendering device 100 in accordance with some embodiments of the present disclosure.

Referring to FIG. 3, the XR rendering device 100 may use a machine learning model 102. For example, the XR rendering device 100 sends 312 a request to the ML-model 102 related to avatar prioritization, where the request contains user data for the participant viewing the immersive XR environment. The ML model 102 receives the request 312 and checks for correlations (i.e. attribute overlap, alikemetric resemblance, etc.) between the participant viewing the immersive XR environment and other participants in the immersive XR environment. The ML model 102 responds 313 to the XR rendering device 100 with at least one avatar that is prioritized based on the user data. The XR rendering device 100 then applies 314*a* prioritized rendering for a first participant device of the at least one avatar in the immersive XR environment. The same prioritized rendering can be applied 314*b* for other participant devices of the at least one avatar in the immersive XR environment.

In further detail, each one of the participant can define rendering prioritization rules that are to be used by the each one of the participants' devices to control prioritization of what is rendered. The rendering prioritization rules may be stored as an attribute of a participant's profile in the participant's device. For example, a first participant can define rendering prioritization rules which is provided 310*a* to the XR rendering device 100 and requests that rendering prioritization be given to an avatar associated with other participants, a virtual object associated with the other participants avatars, and/or which provides a parametric representation and/or a digital graphic representation of the avatar and/or a virtual object for rendering. Similarly, a second participant, such as a participant associated with one of the other participant devices, can define rendering prioritization rules which is provided 310*b* to the XR rendering device 100 and requests that rendering prioritization be given to an avatar associated with the first participant or other participants, a virtual object associated with the first participant's avatar or other participants' avatars, and/or which provides a parametric representation and/or a digital graphic representation of the avatar(s) and/or a virtual object for rendering.

The XR rendering device 100 can control rendering of the XR environment by a rendering circuit 300 based on the rendering prioritization rules that have been defined, and may provide rendered parametric representations of the XR environment to the participant devices for display. Alternatively or additionally, the XR rendering device 100 can use the rendering prioritization rules that have been defined to provide priority commands 314*a*. 314*b*, etc. which control the rendering operations performed by the respective participant devices. For example, the XR rendering device 100 may use the rendering prioritization rules provided 310*a* by the first participant device to generate a message 314*b* that controls rendering priority by one or more other participant devices, such as by controlling: a sequential order in which avatar representing the first participant and/or a sequential order in which the plurality of virtual objects identified by the first participant are rendered on the display device responsive to the preference indicated by the respective rendering prioritization rules: a number of display pixels used to render the avatar representing the first participant and/or the virtual object on the display device responsive to the preference indicated by the rendering prioritization rules; and/or a color depth used to render the avatar representing the first participant and/or the virtual object on the display device responsive to the preference indicated by the rendering prioritization rules. Similarly, the XR rendering device 100 may use the rendering prioritization rules provided 310*b* by the second participant device to generate a message 314*a* that controls rendering priority by the first participant device.

For example, when the XR rendering device 100 determines that an avatar for the first participant has become within the FOV of an avatar for the second participant or is estimated to become within the FOV within a threshold time, the XR rendering device 100 can provide 314*b* the rendering prioritization rules for the first participant to the device of the second participant to control how prioritization is carried out when rendering of the first participant's avatar and/or a virtual object associated with the first participant.

The XR rendering device 100 may determine what to prioritize for rendering based on a ranking of requests indicated by the rendering prioritization rules from the participant devices, e.g., first face, next accessory, next shirt, etc. For example, if a majority of the rendering prioritization rules indicate that the highest priority for rendering is requested for the face of an avatar, followed by an accessory carried by the avatar (e.g., a shield), followed by a shirt worn by the avatar, etc., then the XR rendering device 100 can prioritize sequential rendering of the various items of each of the avatars according to the ranking.

In some embodiments, the XR rendering device uses machine learning (ML) to generate a rendering prioritization rules based on learning related to, for example, what avatar is focused on most (or re-viewed most often) by participants, what type(s) of virtual objects (e.g., clothing articles, weapons, etc.) are focused on most (or re-viewed most often) by participants, etc. In the example of FIG. 3, the XR rendering device 100 can provide context information in a request 312 to the ML model 102 to provide a priority instruction 313 for use by the XR rendering device 100 to control what avatars and/or virtual objects in the XR environment are prioritized for rendering for viewing by participant devices.

Example XR Rendering Device Configuration

Figure 5:
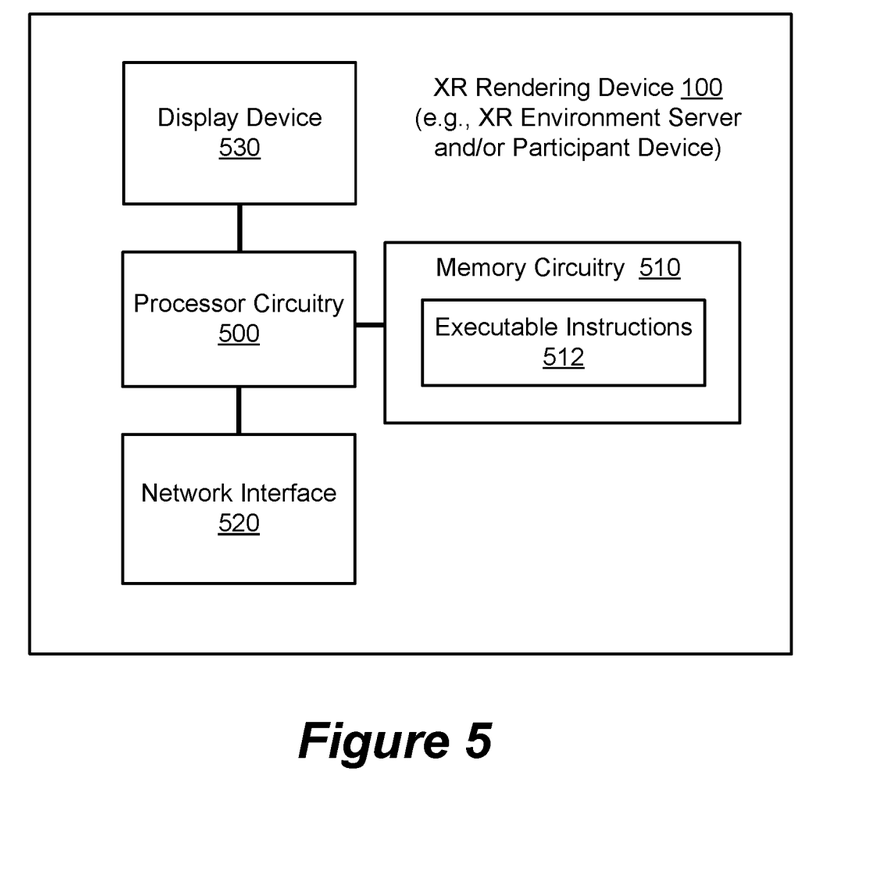
FIG. 5 is a block diagram of components of an XR rendering device that are configured to operate in accordance with some embodiments of the present disclosure.

FIG. 5 is a block diagram of components of an XR rendering device 100 that are configured to operate in accordance with some embodiments of the present disclosure. The XR rendering device 100 can include at least one processor circuit 500 (processor), at least one memory 510 (memory), at least one network interface 520 (network interface), and a display device 530. The processor 500 is operationally connected to these various components. The memory 510 stores executable instructions 512 that are executed by the processor 500 to perform operations. The processor 500 may include one or more data processing circuits, such as a general purpose and/or special purpose processor (e.g., microprocessor and/or digital signal processor), which may be collocated or distributed across one or more data networks. The processor 500 is configured to execute the instructions 512 in the memory 510, described below as a computer readable medium, to perform some or all of the operations and methods for one or more of the embodiments disclosed herein for an XR rendering device. As explained above, the XR rendering device may be separate from and communicatively connect to the participant devices, or may be at least partially integrated within one or more of the participant devices.

Further Definitions and Embodiments

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:
1. An extended reality, XR, rendering device comprising:
at least one processor; and at least one memory storing instructions executable by the
at least one processor to perform operations to:
render an immersive XR environment on a display
device for viewing by a participant among a group of
participants who have associated avatars representing the participants which are rendered in the immersive XR environment;
obtain rendering prioritization rules which indicate
conditions for prioritizing rendering of avatars and/
or virtual objects associated with the avatars; and
when rendering in the immersive XR environment the
avatars representing the group of the participants
and/or the virtual objects associated with the avatars,
prioritize rendering of particular ones of the avatars
and/or particular ones of the virtual objects which
have satisfied conditions indicated by the rendering prioritization rules,
wherein the conditions indicated by the rendering
prioritization rules are related to at least one of:
an avatar of a first participant among the group of
participants is animated as actively talking;
voice loudness of the first participant;
the first participant streaming content to other participants among the group of participants;
the first participant having an avatar within a threshold angular offset of current field of view, FOV, of
the participant viewing the immersive XR environment;
the FOV of the participant viewing the immersive
XR environment rotating towards the avatar of the
first participant;
the participant viewing the immersive XR environment having eye-contact with the avatar of the first
participant; and
the participant viewing the immersive XR environment inputting a gesture towards the avatar of the
first participant.

2. The XR rendering device of claim 1, wherein the
conditions indicated by the rendering prioritization rules are
related to at least one of:
personal relationships defined among the group of participants in the immersive XR environment;
contexts of the immersive XR environment; and
participant roles in the immersive XR environment.

3. The XR rendering device of claim 2, wherein the
personal relationships defined among the participants in the
immersive XR environment are related to at least one of:
observed historical interaction between first and second
participants among the group of participants in the
immersive XR environment;
the first participant having contact information stored in a
contact information repository for the second participant;
the first participant having been in a previous session for
an immersive XR environment with the second participant; and
the first participant having interacted with an avatar
representing the second participant during a previous
session for an immersive XR environment.

4. The XR rendering device of claim 2, wherein the
contexts of the immersive XR environment related to at least
one of:
type of immersive XR environment; number of participants in the immersive XR environment; and
number of participants who are actively interacting with
the immersive XR environment;
identities of participants who are actively interacting with
the immersive XR environment; and
identities of participants who are interacting with other
participants within the immersive XR environment.

5. The XR rendering device of claim 2, wherein the
participant roles in the immersive XR environment relate to
at least one of:
one of the participants having a presenter status;
one of the participants having a meeting organizer status;
and
one of the participants having a non-presenting participant
status.

6. The XR rendering device of claim 1, wherein the
conditions indicated by the rendering prioritization rules are
related to at least one of:
the avatar of a first participant among the group of
participants is within a threshold distance of location of
the avatar of the participant viewing the immersive XR
environment;
the avatar of the first participant is within a threshold
distance of emerging from behind a virtual object of the
immersive XR environment that is currently preventing
viewing by the participant viewing the immersive XR
environment; and
the avatar of the first participant is within a threshold time
of become viewable by the participant viewing the
immersive XR environment based on projected movement by the avatar of the one of the participants or by
the participant viewing the immersive XR environment.

7. The XR rendering device of claim 1, wherein one of the
conditions indicated by the rendering prioritization rules is
related to a facial emotion status of the avatar of one of the
participants.

8. The XR rendering device of claim 1, wherein one of the
conditions indicated by the rendering prioritization rules is
related to rendering resource loading of a participant's
device relative to a threshold capacity level.

9. An extended reality, XR, rendering device comprising:
at least one processor; and
at least one memory storing instructions executable by the
at least one processor to perform operations to:
render an immersive XR environment on a display
device for viewing by a participant among a group of
participants who have associated avatars representing the participants which are rendered in the immersive XR environment;
obtain rendering prioritization rules which indicate
conditions for prioritizing rendering of avatars and/
or virtual objects associated with the avatars; and
when rendering in the immersive XR environment the
avatars representing the group of the participants
and/or the virtual objects associated with the avatars,
prioritize rendering of particular ones of the avatars
and/or particular ones of the virtual objects which
have satisfied conditions indicated by the rendering
prioritization rules,
wherein when rendering in the immersive XR environment the avatars representing the group of the participants and/or the virtual objects associated with the
avatars, the operations prioritize rendering one of the
virtual objects based on the rendering prioritization
rules defining one of the following conditions that is
determined to be satisfied:
the virtual object is touched by the avatar of a first
participant among the group of participants;

the virtual object is within a threshold distance of the avatar of the first participant, wherein the threshold distance is defined by the rendering prioritization rules;

the virtual object is within a field of view, FOV, of a pose of the avatar in the immersive XR environment;

the virtual object is within a threshold angular offset from the FOV of the pose of the avatar of the first participant, wherein the threshold angular offset is defined by the rendering prioritization rules;

the virtual object is predicted to become within the FOV of the pose of the avatar of the first participant within a threshold time defined by the rendering prioritization rules; and the virtual object is predicted to become within the threshold distance of the avatar of the first participant within the threshold time defined by the rendering prioritization rules.

10. A method by an extended reality, XR, rendering device comprising:

rendering an immersive XR environment on a display device for viewing by a participant among a group of participants who have associated avatars representing the participants which are rendered in the immersive XR environment;

obtaining rendering prioritization rules which indicate conditions for prioritizing rendering of avatars and/or virtual objects associated with the avatars; and when rendering in the immersive XR environment the avatars representing the group of the participants and/or the virtual objects associated with the avatars, prioritizing rendering of particular ones of the avatars and/or particular ones of the virtual objects which have satisfied conditions indicated by the rendering prioritization rules, wherein the conditions indicated by the rendering prioritization rules are related to at least one of:

an avatar of a first participant among the group of participants is animated as actively talking;

voice loudness of the first participant;

the first participant streaming content to other participants among the group of participants;

the first participant having an avatar within a threshold angular offset of current field of view, FOV, of the participant viewing the immersive XR environment;

the FOV of the participant viewing the immersive XR environment rotating towards the avatar of the first participant;

the participant viewing the immersive XR environment having eye-contact with the avatar of the first participant; and the participant viewing the immersive XR environment inputting a gesture towards the avatar of the first participant.

11. The method of claim 10, wherein the conditions indicated by the rendering prioritization rules are related to at least one of:

personal relationships defined among the participants in the immersive XR environment;

contexts of the immersive XR environment; and participant roles in the immersive XR environment.

12. The method of claim 11, wherein the personal relationships defined among the participants in the immersive XR environment are related to at least one of:

observed historical interaction between first and second participants among the group of participants in the immersive XR environment;

the first participant having contact information stored in a contact information repository for the second participant;

the first participant having been in a previous session for an immersive XR environment with the second participant; and the first participant having interacted with an avatar representing the second participant during a previous session for an immersive XR environment.

13. The method of claim 11, wherein the contexts of the immersive XR environment related to at least one of:

type of immersive XR environment;

number of participants in the immersive XR environment; and number of participants who are actively interacting with the immersive XR environment;

identities of participants who are actively interacting with the immersive XR environment; and identities of participants who are interacting with other participants within the immersive XR environment.

14. The method of claim 11, wherein the participant roles in the immersive XR environment relate to at least one of:

one of the participants having a presenter status;

one of the participants having a meeting organizer status; and one of the participants having a non-presenting participant status.

15. The method of claim 10, wherein the conditions indicated by the rendering prioritization rules are related to at least one of:

the avatar of a first participant among the group of participants is within a threshold distance of location of the avatar of the participant viewing the immersive XR environment;

the avatar of the first participant is within a threshold distance of emerging from behind a virtual object of the immersive XR environment that is currently preventing viewing by the participant viewing the immersive XR environment; and the avatar of the first participant is within a threshold time of become viewable by the participant viewing the immersive XR environment based on projected movement by the avatar of the one of the participants or by the participant viewing the immersive XR environment.

16. The method of claim 10, wherein one of the conditions indicated by the rendering prioritization rules is related to a facial emotion status of the avatar of one of the participants.

17. The method of claim 10, wherein one of the conditions indicated by the rendering prioritization rules is related to rendering resource loading of a participant's device relative to a threshold capacity level.

18. The method of claim 10, wherein when rendering in the immersive XR environment the avatars representing the group of the participants and/or the virtual objects associated with the avatars, the operations prioritize rendering one of the virtual objects based on the rendering prioritization rules defining one of the following conditions that is determined to be satisfied:

the virtual object is touched by the avatar of a first participant among the group of participants;

the virtual object is within a threshold distance of the avatar of the first participant, wherein the threshold distance is defined by the rendering prioritization rules;

the virtual object is within a field of view, FOV, of a pose of the avatar in the immersive XR environment;

the virtual object is within a threshold angular offset from the FOV of the pose of the avatar of the first participant, wherein the threshold angular offset is defined by the rendering prioritization rules;

the virtual object is predicted to become within the FOV of the pose of the avatar of the first participant within a threshold time defined by the rendering prioritization rules; and the virtual object is predicted to become within the threshold distance of the avatar of the first participant within the threshold time defined by the rendering prioritization rules.

\* \* \* \* \*